United States Patent
Handing et al.

(10) Patent No.: US 8,360,490 B2
(45) Date of Patent: Jan. 29, 2013

(54) BUMPER CROSSBEAM AS COMPONENT OF A BUMPER OF A MOTOR VEHICLE

(75) Inventors: Christian Handing, Langenberg (DE); Michael Roll, Bielefeld (DE); Stephan Possberg, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 106 days.

(21) Appl. No.: 12/892,304

(22) Filed: Sep. 28, 2010

(65) Prior Publication Data
US 2011/0254294 A1     Oct. 20, 2011

(30) Foreign Application Priority Data
Sep. 28, 2009  (DE) .................. 10 2009 043 022

(51) Int. Cl.
*B60R 19/03*   (2006.01)
(52) U.S. Cl. ........................ 293/120; 293/102
(58) Field of Classification Search ............... 296/102, 296/120; 293/102, 120
See application file for complete search history.

(56) References Cited

U.S. PATENT DOCUMENTS

| | | | |
|---|---|---|---|
| 3,827,740 A | 8/1974 | Golze et al. | |
| 5,080,410 A * | 1/1992 | Stewart et al. | 293/102 |
| 6,217,089 B1 * | 4/2001 | Goto et al. | 293/102 |
| 6,349,521 B1 * | 2/2002 | McKeon et al. | 293/102 |
| 6,439,650 B2 * | 8/2002 | Artner et al. | 296/187.03 |
| 6,726,259 B2 | 4/2004 | Kettler et al. | |
| 6,746,061 B1 * | 6/2004 | Evans | 293/120 |
| 6,851,731 B2 * | 2/2005 | Janssen | 293/102 |
| 6,948,749 B2 * | 9/2005 | Graber | 293/102 |
| 6,962,379 B2 * | 11/2005 | Minami et al. | 293/120 |
| 7,017,960 B2 * | 3/2006 | Reierson et al. | 293/102 |
| 7,201,413 B2 | 4/2007 | Hillekes et al. | |
| 7,354,030 B2 * | 4/2008 | Murayama et al. | 267/140 |
| 7,357,432 B2 | 4/2008 | Roll et al. | |
| 7,360,811 B2 | 4/2008 | Roll et al. | |
| 7,399,013 B2 | 7/2008 | Lütke-Bexten et al. | |
| 7,422,252 B2 | 9/2008 | Gouillart et al. | |
| 7,607,705 B1 * | 10/2009 | Mast et al. | 293/117 |
| 7,823,939 B2 | 11/2010 | Handing et al. | |
| 7,954,866 B2 * | 6/2011 | Barcomb et al. | 293/143 |
| 2004/0084910 A1 * | 5/2004 | Amano et al. | 293/102 |
| 2004/0135382 A1 * | 7/2004 | Sakuma et al. | 293/102 |
| 2005/0082850 A1 * | 4/2005 | Reierson et al. | 293/102 |
| 2006/0028032 A1 | 2/2006 | Henseleit | |
| 2006/0082170 A1 * | 4/2006 | Reierson et al. | 293/102 |
| 2007/0284896 A1 * | 12/2007 | Wakabayashi et al. | 293/120 |
| 2008/0012364 A1 * | 1/2008 | Boggess | 293/120 |
| 2008/0083498 A1 | 4/2008 | Handing | |
| 2008/0224487 A1 | 9/2008 | Wang et al. | |

(Continued)

FOREIGN PATENT DOCUMENTS

| DE | 2326123 | 12/1973 |
|---|---|---|
| DE | 19505364 | 8/1996 |

(Continued)

*Primary Examiner* — Lori Lyjak
(74) *Attorney, Agent, or Firm* — Henry M. Feiereisen, LLC

(57) ABSTRACT

A bumper crossbeam for a motor vehicle includes an outer section configured as a roll-formed hollow profile which is closed at least in some areas. At least one inner section, configured as a separate component, is arranged in the outer section and connected to the outer section. The inner section has at least one wall extending from a front section zone of the outer section to a rear section zone of the outer section.

25 Claims, 2 Drawing Sheets

U.S. PATENT DOCUMENTS

| | | |
|---|---|---|
| 2008/0252087 A1 | 10/2008 | Roll et al. |
| 2008/0284183 A1* | 11/2008 | Johnson ................... 293/102 |
| 2009/0045638 A1 | 2/2009 | Handing et al. |
| 2009/0152881 A1* | 6/2009 | Shin ....................... 293/102 |
| 2009/0162688 A1 | 6/2009 | Handing et al. |
| 2009/0236163 A1 | 9/2009 | Wibbeke et al. |
| 2009/0243312 A1 | 10/2009 | Handing et al. |
| 2010/0109353 A1* | 5/2010 | Allen et al. .............. 293/120 |
| 2010/0133859 A1 | 6/2010 | Lütke-Bexten et al. |
| 2010/0133861 A1 | 6/2010 | Lütke-Bexten et al. |
| 2010/0176610 A1 | 7/2010 | Roll et al. |
| 2010/0194125 A1 | 8/2010 | Wibbeke et al. |
| 2010/0276950 A1 | 11/2010 | Wang et al. |

FOREIGN PATENT DOCUMENTS

| | | |
|---|---|---|
| DE | 19852462 | 5/2000 |
| DE | 10013527 | 10/2001 |
| DE | 10205627 | 8/2003 |
| DE | 102008017055 | 10/2009 |
| EP | 1210998 | 7/2004 |
| GB | 1492752 | 11/1977 |

* cited by examiner

BUMPER CROSSBEAM AS COMPONENT OF A BUMPER OF A MOTOR VEHICLE

CROSS-REFERENCES TO RELATED APPLICATIONS

This application claims the priority of German Patent Application, Serial No. 10 2009 043 022.9-21, filed Sep. 28, 2009, pursuant to 35 U.S.C. 119(a)-(d), the content of which is incorporated herein by reference in its entirety as if fully set forth herein.

BACKGROUND OF THE INVENTION

The present invention relates to a bumper crossbeam as component of a bumper of a motor vehicle.

The following discussion of related art is provided to assist the reader in understanding the advantages of the invention, and is not to be construed as an admission that this related art is prior art to this invention.

Motor vehicles have bumpers which are arranged in the front and rear zones of the vehicle. Load-Bearing component is a crossbeam which is connected on both its end zones via crash boxes with the side rails of the vehicle. Plastic casings can be provided to cover the crossbeam to the outside and are intended i.a. to match the optics of the vehicle design. The bumper transfers the impact energy generated at crashes at slight speed via the crossbeam to the crash boxes which convert the kinetic energy into plastic deformation so as to dampen the impact and to reduce stress on the remaining vehicle structure and vehicle occupants. For ecological and economic reasons, use of material and production costs for the crossbeam should be kept to a minimum while still affording good crash characteristics.

To date, it has been proposed to establish individual section zones of the crossbeam of varying material thicknesses and strength to meet requirements at hand. This requires various rolling and winding processes of the starting material and complex combination of joining and shaping working operations. In particular, when methods are involved which include different joining processes for producing varying material thicknesses in the run-up to the shaping operation, problems have been encountered in connection with dimensional precision of the end product. While roll-forming has been considered an efficient manufacturing process to attain high shaping speeds, small number of operating cycles, and high dimensional precision, roll-forming suffers shortcomings relating to a small material thickness throughout which can be adjusted only by doubling the material.

It would therefore be desirable and advantageous to address prior art shortcomings and to provide an improved bumper crossbeam which is easy to manufacture and lightweight while still maintaining strength and being reliable in operation.

SUMMARY OF THE INVENTION

According to one aspect of the present invention, a bumper crossbeam for a motor vehicle includes an outer section configured as a roll-formed hollow profile which is closed at least in some areas, and at least one inner section which is arranged in the outer section and configured as a separate component and which is connected to the outer section, with the inner section having at least one wall extending from a front section zone of the outer section to a rear section zone of the outer section.

The present invention resolves prior art problems by combining the outer and inner sections in a manner according to the present invention so as to be able to realize different deformation resistances through variation of the configuration of the inner section. This can be achieved without altering the outer geometry of the outer section. Manufacture of a bumper crossbeam according to the invention is cost-efficient and allows a wide spectrum as far as material selection, wall thickness conditions, and selection of the inner geometry are concerned. As there is no need to execute complicated shaping works on a single component for the entire cross sectional structure, unnecessary doubling of the starting material is for example avoided so that the overall production process becomes more economical. In addition, the wall extending from a front section zone of the outer section to a rear section zone of the outer section serves a reinforcement web.

According to another advantageous feature of the present invention, the inner section may be provided with flanges angled in relation to the wall on opposite ends thereof for connection of the inner section to the outer section. The length of each flange may advantageously range from 5 to 20 mm, although the flanges may in principle have the same or varying lengths.

While the inner section may have various straight, angled, or rounded cross sectional configurations, like for example S, Z, L, or U shape or a combination thereof, it is advantageous when the angled flanges of the inner section point in opposite directions.

Whereas a Z shape of the inner section between the angled flanges has a straight contour profile, the other shapes have at least a change in direction of the contour profile between the two angled flanges of the inner section.

According to another advantageous feature of the present invention, the inner section may also be constructed as a closed hollow section. So long as the inner section is arranged as closed hollow section in the outer section, the inner section has advantageously a round cross section. As a result, a smaller circumference and thus a smaller weight are realized in comparison to a rectangular cross section, when, for example, the maximum outer dimensions and wall thicknesses are the same. Still, the invention affords the possibility to provide the inner section with an angled cross section for stiffening the outer section.

According to another advantageous feature of the present invention, the outer section is defined by a height, as measured in a vertical direction, at a ratio of 2:1 to 4.5:1 in relation to a depth of the outer section, as measured perpendicular to the vertical direction.

According to another advantageous feature of the present invention, the height of the outer section can be dimensioned at a ratio of 9:1 to 3:2 in relation to a height of the inner section, as measured in the vertical direction.

According to another advantageous feature of the present invention, the at least one wall of the inner section may be provided with at least one opening to reduce a deformation resistance of the inner section. This not only reduces weight but also enables to adjust the stiffness to a desired level.

According to another advantageous feature of the present invention, at least one of the sections zones of the outer section can be configured as a reinforcing embossment. As a result, the stiffness of the bumper crossbeam can be increased. Suitably, the region of the reinforcing embossment is recessed behind the neighboring regions of the outer section.

According to another advantageous feature of the present invention, the inner section and the outer section of the bumper crossbeam may each have a yield point of >700 MPa and a tensile strength of >900 MPa.

According to another advantageous feature of the present invention, the yield point and the tensile strength of the inner section may be lower than the yield point and the tensile strength of the outer section. Depending on the wanted degree of stiffness of the bumper crossbeam, different material parameters can be selected for the inner and outer sections to satisfy respective crash test conditions. Advantageously, the yield point of the inner section can be <700 MPa and the tensile strength <900 MPa, whereas the yield point of the outer section can be >700 MPa and the tensile strength >900 MPa.

According to another advantageous feature of the present invention, the inner section has a wall thickness which can be smaller by 25% to 50% than a wall thickness of the outer section. As a result, a bumper crossbeam can be made economically and lightweight. Advantageously, the inner section of the bumper crossbeam may have has a wall thickness of 1.8 mm and the outer section a wall thickness of 2.5 mm. Combining different contours and wall thicknesses for the inner and outer sections of the bumper crossbeam affords for the first time a fast fabrication to meet most different demands. Even though, the outer section and also the inner section undergo a continuous roll-forming process, varying material thicknesses can still be implemented in a simple manner. In particular, the use of tailored blanks is possible for the inner section and/or the outer section, i.e. sheet metal blanks which are comprised of different material qualities and/or sheet metal thicknesses. In particular the use of tailored rolled blanks is possible which have regions of varying sheet metal thicknesses through rolling operation. There is no need to oversize regions of the contour. The targeted reduction in wall thickness results in a potential weight saving of up to 10% compared to conventionally manufactured crossbeams.

Moreover, protracted and occasionally complicated sequences of shaping processes are eliminated because the simple placement within one another of two sections which are easy to make renders the production fast and adaptable. In addition, a complicated pre-manufacture of the metal sheets to be contoured with required tolerances by preceding assembly of sheet metal strips of varying thickness and/or quality becomes superfluous. The rapid and simple combination possibility of different contours, material qualities, and wall thicknesses provides therefore an economical manufacturing solution which can be modified in a short time to suit changing demands.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
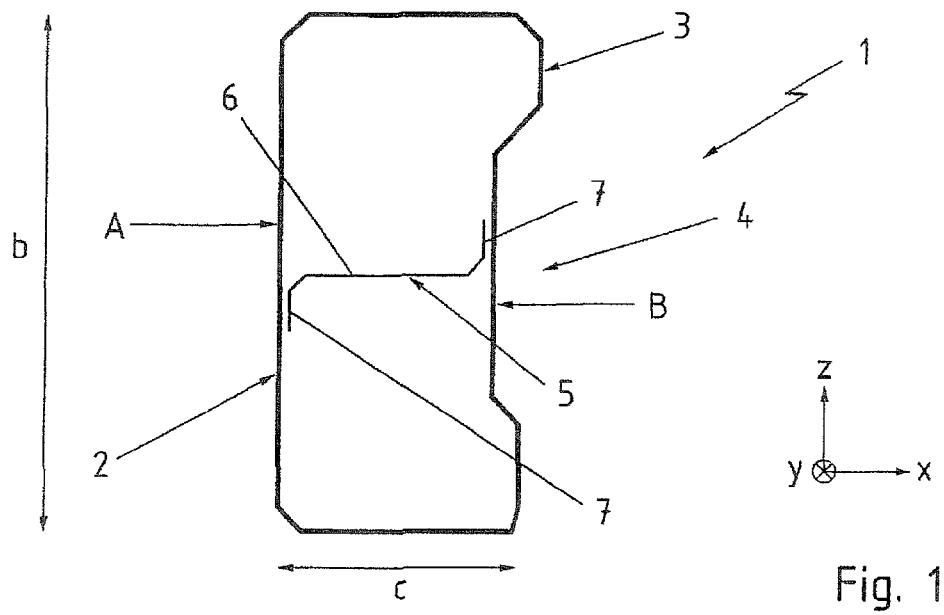
FIG. 1 is a sectioned schematic side view of a first embodiment of a bumper crossbeam according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic side view of a first embodiment of a bumper crossbeam according to the invention, generally designated by reference numeral 1. The bumper crossbeam 1 has a substantially rectangular contour in cross section, defined by an outer section 2. The outer section 2 is formed by a hollow section 3. The outer cross sectional dimensions of the hollow section 3 indicate that a height b of the outer section 2, as measured in vertical direction z, is at least twice as high as its depth c measured perpendicular to the height b.

The component length extending in longitudinal axis of the bumper crossbeam 1 is not shown in greater detail, i.e. a yard ware produced by a continuous process is involved here.

The cross section of the outer section 2 is beveled in the corners of its contour and has a rear section zone A and a front section zone B on the opposite side. The contour in the section zone B of the outer section 2, configured as hollow section, differs from the section zone A by the presence of a reinforcing embossment 4 in the contour. The part of the contour in the section zone B of the outer section 2 is hereby recessed to the inside to extend behind the neighboring regions 3 of the outer section 2.

Accommodated inside the outer section 2 is an inner section 5 which has a single wall 6 extending from the rear section zone A towards the reinforcing embossment 4 in the front section zone B. Flanges 7 are provided on both ends of the wall 6 of the inner section 5 and angled in relation to the wall 6, with the flanges 7 pointing in opposite directions, respectively. The flanges 7 of the wall 6 of the inner section 5 extend in parallel relation to the contour of the outer section 2 in the section zone A and section zone B. The material thickness of the inner section 5 is smaller than the one of the outer section 2.

Figure 2:
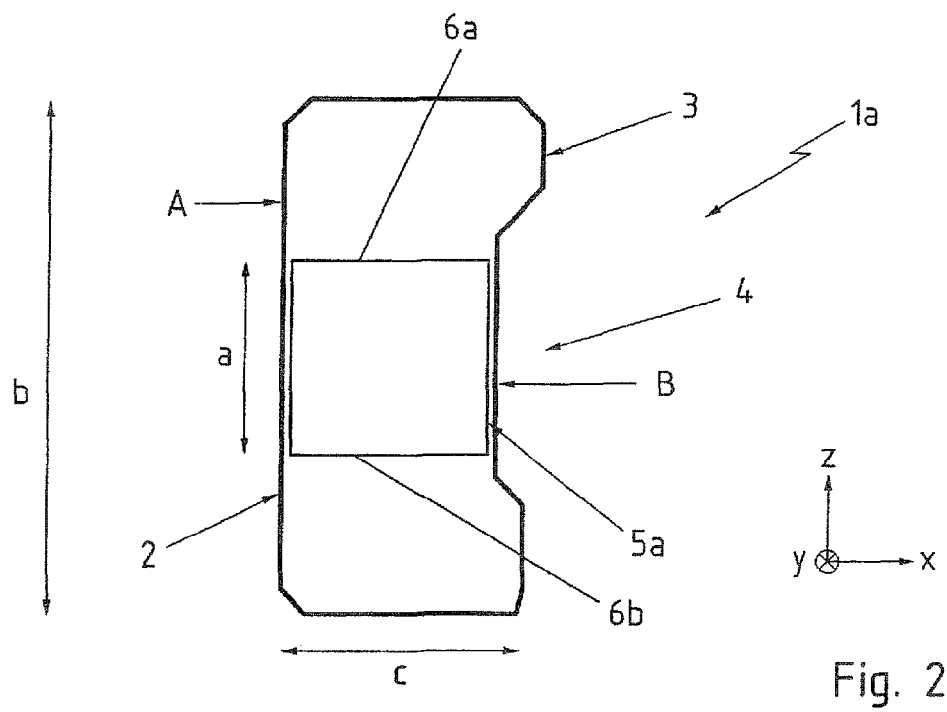
FIG. 2 is a schematic side view of a second embodiment of a bumper crossbeam according to the invention, depicting a modified inner contour profile.

FIG. 2 shows a schematic side view of a second embodiment of a bumper crossbeam according to the invention, generally designated by reference numeral 1a. In the following description, parts corresponding with those in FIG. 1 will be identified, where appropriate for the understanding of the invention, by corresponding reference numerals followed by an "a". In this embodiment, the bumper crossbeam 1a includes the outer section 2 as hollow section, illustrated in FIG. 1. An inner section 5a is formed by a hollow section of rectangular cross section, with a wall 6a and a wall 6b respectively extending from the rear section zone A to the reinforcing embossments 4 in the section zone B. The inner section 5a has a height a measured in vertical direction z. The height a of the inner section 5a does not extend over the entire height b of the outer section 2 but is restricted only to the region of the front section zone B where the reinforcing embossment 4 is present.

Figure 3:
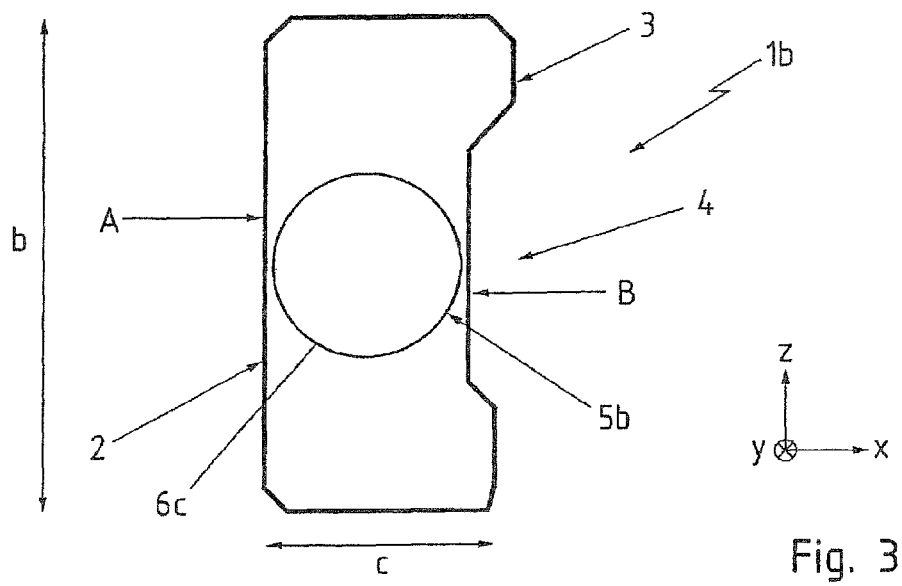
FIG. 3 is a schematic side view of a third embodiment of a bumper crossbeam according to the invention, depicting another inner contour profile.

FIG. 3 shows a schematic side view of a third embodiment of a bumper crossbeam according to the invention, generally designated by reference numeral 1b. In the following description, parts corresponding with those in FIG. 1 will be identified, where appropriate for the understanding of the invention, by corresponding reference numerals followed by a "b". In this embodiment, the bumper crossbeam 1b also includes the outer section 2 as hollow section, illustrated in FIG. 1. Accommodated in the outer section 2 is an inner section 5b which is realized by a round hollow section in cross section. A rotation symmetric wall 6c of the inner section 5b also extends from the rear section zone A towards the reinforcing embossment 4 in the front section zone B.

Figure 4:
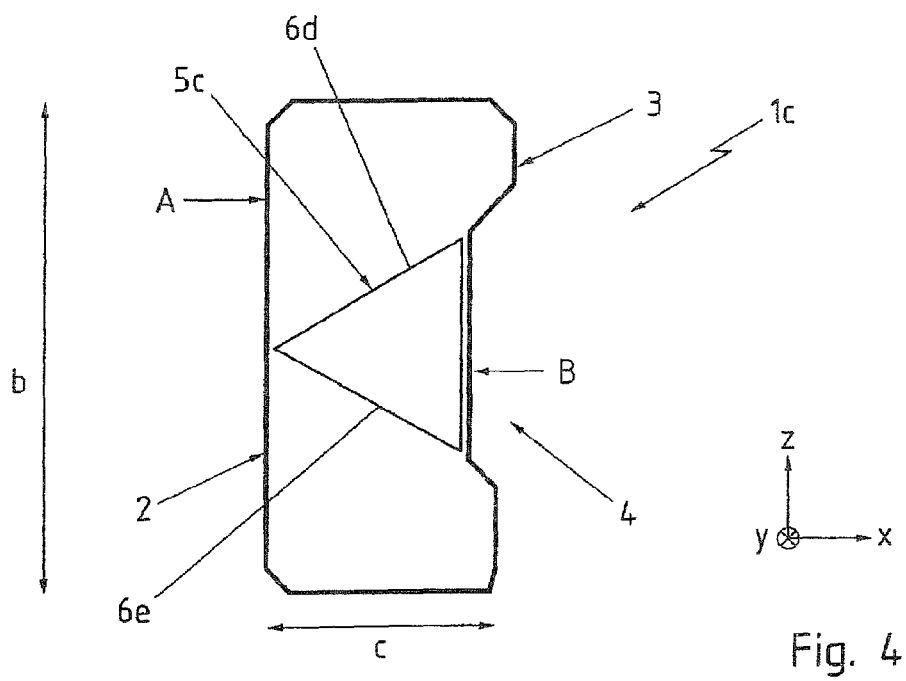
FIG. 4 is a schematic side view of a fourth embodiment of a bumper crossbeam according to the invention, depicting yet another inner contour profile.

FIG. 4 shows a schematic side view of a fourth embodiment of a bumper crossbeam according to the invention, generally designated by reference numeral 1c. In the following description, parts corresponding with those in FIG. 1 will be identified, where appropriate for the understanding of the invention, by corresponding reference numerals followed by a "c". In this embodiment, the bumper crossbeam 1c also includes the outer section 2 as hollow section, illustrated in FIG. 1. Accommodated in the outer section 2 is an inner section 5c which is realized by a hollow section of triangular shape. One side of the inner section 5c extends in parallel relation to the contour of the front section zone B of the outer section 2. The coinciding legs of the triangular inner section 5c extend by way of a wall 6d and a wall 6e to the opposite rear section zone A of the outer section 2.

A bumper crossbeam 1, 1a, 1b, 1c according to the present invention can thus be manufactured from a combination of roll-formed outer and inner sections. The cross sectional shape of the inner section 5, 5a, 5b, 5c can be incorporated into the manufacturing process of the outer section 2, with the inner section 5, 5a, 5b, 5c being rolled into the outer section 2. As an alternative, the inner section 5, 5a, 5b, 5c may also be inserted subsequently into the finished outer section 2 and connected therewith. The material thicknesses and qualities as well as cross sectional shapes of the outer section 2 and the inner section 5, 5a, 5b, 5c can be suitably selected, combined with one another, and fixed in place or connected throughout in dependence of the demand. In this way, a bumper crossbeam can be produced with little use of material and simple production methods and can be provided with a combination of material strengths.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A bumper crossbeam for a motor vehicle, comprising:
    an outer section configured as a roll-formed hollow profile which is closed at least in some areas; and
    at least one inner section which is arranged in the outer section and configured as a separate component and which is connected to the outer section said inner section is being configured as closed hollow profile and having at least one wall extending from a front section zone of the outer section to a rear section zone of the outer section.

2. The bumper crossbeam of claim 1, wherein the inner section has flanges angled in relation to the wall on opposite ends thereof for connection of the inner section to the outer section.

3. The bumper crossbeam of claim 2, wherein the flanges point in opposite directions.

4. The bumper crossbeam of claim 1, wherein the inner section in the form of a hollow section has a round cross section.

5. The bumper crossbeam of claim 1, wherein the inner section in the form of a hollow section has an angled cross section.

6. The bumper crossbeam of claim 1, wherein the outer section is defined by a height, as measured in a vertical direction, at a ratio of 9:1 to 3:2 in relation to a height of the inner section, as measured in the vertical direction.

7. The bumper crossbeam of claim 1, wherein each of the inner and outer sections is defined by a yield point of >700 MPa and a tensile strength of >900 MPa.

8. The bumper crossbeam of claim 1, wherein each of the inner and outer sections is defined by a yield point and a tensile strength, wherein the yield point and the tensile strength of the inner section is lower than the yield point and tensile strength of the outer section.

9. The bumper crossbeam of claim 1, wherein the inner section has a wall thickness which is smaller by 25% to 50% than a wall thickness of the outer section.

10. The bumper crossbeam of claim 1, wherein at least one of the inner and outer sections is formed from a tailored rolled blank.

11. A bumper crossbeam for a motor vehicle, comprising:
    an outer section configured as a roll-formed hollow profile which is closed at least in some areas; and
    at least one inner section which is arranged in the outer section and configured as a separate component and which is connected to the outer section, said inner section having at least one wall extending from a front section zone of the outer section to a rear section zone of the outer section and having at least one opening to reduce a deformation resistance.

12. The bumper crossbeam of claim 11, wherein the outer section is defined by a height, as measured in a vertical direction, at a ratio of 2:1 to 4.5:1 in relation to a depth of the outer section, as measured perpendicular to the vertical direction.

13. The bumper crossbeam of claim 11, wherein the inner section has flanges angled in relation to the wall on opposite ends thereof for connection of the inner section to the outer section.

14. The bumper crossbeam of claim 11, wherein each of the inner and outer sections is defined by a yield point and a tensile strength, wherein the yield point and the tensile strength of the inner section is lower than the yield point and tensile strength of the outer section.

15. The bumper crossbeam of claim 14, wherein the yield point of the inner section is <700 MPa and the tensile strength is <900 MPa, whereas the yield point of the outer section is >700 MPa and the tensile strength is >900 MPa.

16. The bumper crossbeam of claim 11, wherein the inner section has a wall thickness which is smaller by 25% to 50% than a wall thickness of the outer section.

17. The bumper crossbeam of claim 11, wherein at least one of the inner and outer sections is formed from a tailored rolled blank.

18. A bumper crossbeam for a motor vehicle, comprising:
    an outer section configured as a roll-formed hollow profile which is closed at least in some areas; and at least one inner section which is arranged in the outer section and configured as a separate component and which is connected to the outer section, said inner section having at least one wall extending from a front section zone of the outer section to a rear section zone of the outer section, wherein at least one of the sections zones of the outer section is configured as a reinforcing embossment.

19. The bumper crossbeam of claim 18, wherein the reinforcing embossment is recessed inwards to extend behind a neighboring region of the outer section.

20. The bumper crossbeam of claim 18, wherein the inner section has flanges angled in relation to the wall on opposite ends thereof for connection of the inner section to the outer section.

21. The bumper crossbeam of claim 18, wherein the outer section is defined by a height, as measured in a vertical direction, at a ratio of 2:1 to 4.5:1 in relation to a depth of the outer section, as measured perpendicular to the vertical direction.

22. The bumper crossbeam of claim 18, wherein each of the inner and outer sections is defined by a yield point of >700 MPa and a tensile strength of >1000 MPa.

23. The bumper crossbeam of claim 18, wherein each of the inner and outer sections is defined by a yield point and a tensile strength, wherein the yield point and the tensile strength of the inner section is lower than the yield point and tensile strength of the outer section.

24. The bumper crossbeam of claim 18, wherein the inner section has a wall thickness which is smaller by 25% to 50% than a wall thickness of the outer section.

25. The bumper crossbeam of claim 18, wherein at least one of the inner and outer sections is formed from a tailored rolled blank.

\* \* \* \* \*

UNITED STATES PATENT AND TRADEMARK OFFICE
CERTIFICATE OF CORRECTION

PATENT NO. : 8,360,490 B2  
APPLICATION NO. : 12/892304  
DATED : January 29, 2013  
INVENTOR(S) : Christian Handing et al.

Page 1 of 1

It is certified that error appears in the above-identified patent and that said Letters Patent is hereby corrected as shown below:

Column 5, Claim 1, Lines 6-7: change "inner section is being" to "inner section being".

Signed and Sealed this  
Second Day of April, 2013

Teresa Stanek Rea  
*Acting Director of the United States Patent and Trademark Office*